United States Patent
DeDona et al.

(10) Patent No.: US 9,969,276 B2
(45) Date of Patent: May 15, 2018

(54) PLUG-IN VEHICLE WITH SECONDARY DC-DC CONVERTER

(71) Applicant: Ford Global Technologies, LLC, Dearborn, MI (US)

(72) Inventors: Matthew Roger DeDona, Northville, MI (US); Arthur M. Rutyna, Plymouth, MI (US); Mark J. Ferrel, Brighton, MI (US); Bo Wu, Northville, MI (US); Hilde Anne Heremans, Farmington Hills, MI (US); Christopher W. Bell, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 796 days.

(21) Appl. No.: 14/049,717

(22) Filed: Oct. 9, 2013

(65) Prior Publication Data
US 2015/0097527 A1    Apr. 9, 2015

(51) Int. Cl.
*B60L 11/18* (2006.01)
*B60L 1/00* (2006.01)
*B60L 11/14* (2006.01)

(52) U.S. Cl.
CPC .............. *B60L 11/1818* (2013.01); *B60L 1/00* (2013.01); *B60L 11/14* (2013.01);
(Continued)

(58) Field of Classification Search
CPC ... B60L 11/1868; B60L 11/1818; Y02T 60/12
(Continued)

(56) References Cited

U.S. PATENT DOCUMENTS 8,054,039 B2    11/2011  Bauerle et al.
8,143,859 B2 *   3/2012  Iida .......................... B60L 1/00
                                                                 320/134
(Continued)

FOREIGN PATENT DOCUMENTS

EP         2 228 882 A2    9/2010
WO       2011127446 A2   10/2011

OTHER PUBLICATIONS

New Eagle, Mechatronic Control Solutions, Electric Vehicle Supervisor System, Jul. 3, 2012.
(Continued)

*Primary Examiner* — Drew A Dunn
*Assistant Examiner* — Jerry D Robbins
(74) *Attorney, Agent, or Firm* — David B. Kelley; Brooks Kushman P.C.

(57) ABSTRACT

A vehicle includes a traction battery, an auxiliary battery, a charger, and two DC-DC converters. A first DC-DC converter is connected between the traction battery and the auxiliary battery through a main contactor. A second DC-DC converter is connected between the charger and the auxiliary battery. The charger is configured to charge the auxiliary battery via the second DC-DC converter when the charger is receiving power. The second DC-DC converter is configured to charge the auxiliary battery when the first DC-DC converter is disconnected from the traction battery. The second DC-DC converter can charge the auxiliary battery independent of the charger charging the traction battery. The second DC-DC converter may be configured to generally maximize power conversion efficiency in a range of power outputs associated with charging the auxiliary battery.

10 Claims, 4 Drawing Sheets

(52) U.S. Cl.
CPC ....... *B60L 11/1868* (2013.01); *B60L 11/1877* (2013.01); *B60L 2210/12* (2013.01); *B60L 2210/30* (2013.01); *B60L 2210/40* (2013.01); *B60L 2230/12* (2013.01); *B60L 2240/34* (2013.01); *B60L 2240/80* (2013.01); *B60L 2260/56* (2013.01); *B60L 2270/20* (2013.01); *Y02T 10/70* (2013.01); *Y02T 10/7005* (2013.01); *Y02T 10/7066* (2013.01); *Y02T 10/7077* (2013.01); *Y02T 10/7088* (2013.01); *Y02T 10/7233* (2013.01); *Y02T 10/7241* (2013.01); *Y02T 90/121* (2013.01); *Y02T 90/127* (2013.01); *Y02T 90/14* (2013.01)

(58) Field of Classification Search
USPC .................................................. 320/104, 109
See application file for complete search history.

(56) References Cited

U.S. PATENT DOCUMENTS

| | | |
|---|---|---|
| 2009/0306841 A1 | 12/2009 | Miwa et al. |
| 2010/0066302 A1* | 3/2010 | Gregg et al. .................. 320/104 |
| 2010/0213896 A1 | 8/2010 | Ishii et al. |
| 2010/0270860 A1 | 10/2010 | Kamaga |
| 2011/0101915 A1 | 5/2011 | Mitsutani |
| 2011/0127956 A1 | 6/2011 | Mitsutani |
| 2011/0168462 A1* | 7/2011 | Stanek et al. ................ 180/65.1 |
| 2011/0169447 A1 | 7/2011 | Brown et al. |
| 2011/0218698 A1* | 9/2011 | Bissontz ......................... 701/22 |
| 2011/0309793 A1* | 12/2011 | Mitsutani ...................... 320/109 |
| 2012/0025842 A1 | 2/2012 | Gibbs et al. |
| 2012/0041855 A1 | 2/2012 | Sterling et al. |
| 2012/0123625 A1* | 5/2012 | Ueo et al. ....................... 701/22 |
| 2012/0326502 A1 | 12/2012 | Nguyen et al. |
| 2013/0054069 A1 | 2/2013 | Komiya et al. |
| 2013/0099740 A1 | 4/2013 | Takashima et al. |
| 2013/0175858 A1* | 7/2013 | Sakurai et al. ................ 307/9.1 |
| 2013/0221921 A1* | 8/2013 | Ang ............................ 320/109 |

OTHER PUBLICATIONS

SAE International Surface Vehicle Recommended Practice, J1772TM, Issued: Oct. 1996, Revised Oct. 2012, Oct. 2012.

Chinese Patent Office, First Office Action for the corresponding Chinese Patent Application No. 201410528624.0, dated Aug. 30, 2017.

* cited by examiner

PLUG-IN VEHICLE WITH SECONDARY DC-DC CONVERTER

TECHNICAL FIELD

This application relates to supplying power to an auxiliary battery while connected to electric vehicle supply equipment.

BACKGROUND

Electric and plug-in electric vehicles require an interface to external charging devices. In order to promote standard interfaces among vehicle and charge station manufacturers, industry standards have been developed. One such standard is the SAE Electric Vehicle and Plug in Hybrid Electric Vehicle Conductive Charge Coupler (J1772) standard. The J1772 standard defines a charge coupler and the associated protocol required for transferring energy to the vehicle. The standard defines a common interface that all vehicle and charge station manufacturers are encouraged to follow.

A plug-in hybrid or electric vehicle connects to electric vehicle supply equipment (EVSE) to charge a traction battery. A DC-DC converter switchably connected to the traction battery through a contactor provides power to an auxiliary battery during charging. In order to provide power to the auxiliary battery, the voltage of the traction battery must be supplied to a high-voltage bus.

SUMMARY

A vehicle includes a traction battery, an auxiliary battery, a charger, and first DC-DC converter electrically connected with the auxiliary battery and configured to be selectively electrically connected with the traction battery. The vehicle further includes a second DC-DC converter electrically connected between the auxiliary battery and the charger, wherein the charger is configured to charge the auxiliary battery via the second DC-DC converter when the charger is receiving power and the first DC-DC converter is disconnected from the traction battery. The charger may be further configured to be selectively electrically connected with the traction battery. The charger may be further configured to charge the auxiliary battery via the second DC-DC converter when the charger is disconnected from the traction battery. The charger may be further configured to provide power to the first DC-DC converter when the charger is connected to the traction battery and the first DC-DC converter is connected to the traction battery. The charger may be further configured to adjust a voltage output level of the second DC-DC converter. The charger may be further configured to charge the auxiliary battery via the second DC-DC converter for a predetermined amount of time before enabling power to electrical loads connected to the auxiliary battery. The second DC-DC converter may be configured to generally maximize power conversion efficiency in a range of power outputs associated with charging the auxiliary battery.

A vehicle includes a charge and a first DC-DC converter switchably connected to a traction battery through a main contactor, electrically connected with an auxiliary battery, and configured to charge the auxiliary battery when the main contactor is closed. The vehicle further includes a second DC-DC converter, electrically connected between the auxiliary battery and a charger, configured to charge the auxiliary battery when the main contactor is open and the charger is receiving power. The charger may be switchably connected to the traction battery through a second contactor. The second DC-DC converter may be further configured to charge the auxiliary battery when the second contactor is open. The main contactor may be configured to be closed when the charger is switchably connected to the traction battery in the presence of a request for cabin pre-conditioning. The second DC-DC converter may be configured to generally maximize power conversion efficiency in a range of power outputs associated with charging the auxiliary battery.

A method of charging an auxiliary battery that includes, in response to electric vehicle supply equipment (EVSE) being connected to a vehicle charge port to provide power to an on-board charger, operating, by at least one controller, a second DC-DC converter electrically connected between the auxiliary battery and the on-board charger to charge the auxiliary battery in the absence of a first DC-DC converter being switchably connected to a traction battery. Operating the second DC-DC converter may include adjusting a voltage output level of the second DC-DC converter. Operating the second DC-DC converter may include charging the auxiliary battery for a predetermined amount of time before activating electrical loads connected to the auxiliary battery. The method may further include operating the first DC-DC converter to charge the auxiliary battery when the first DC-DC converter is switchably connected to the traction battery. The method may further include operating the second DC-DC converter to charge the auxiliary battery when the on-board charger is not switchably connected to the traction battery.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
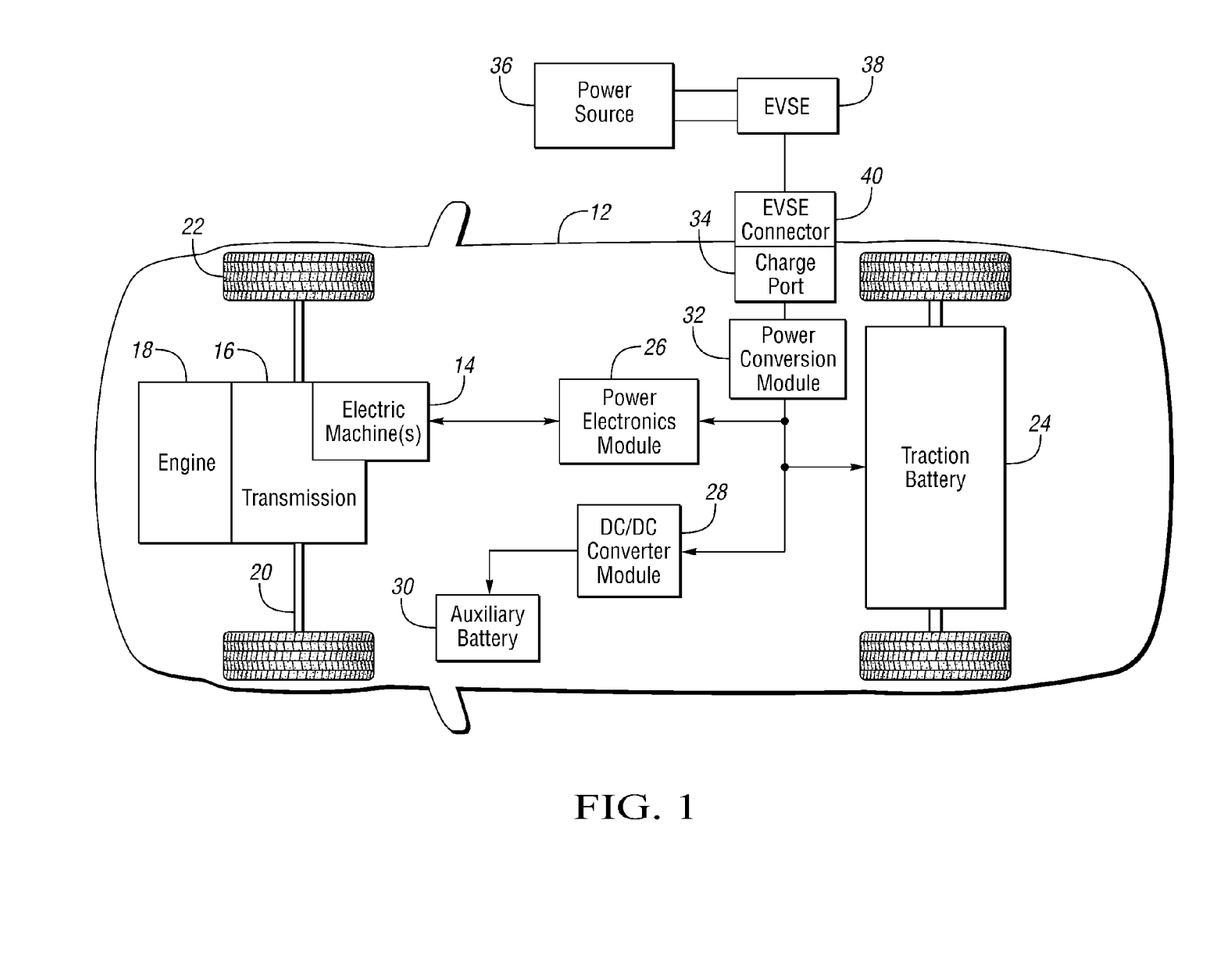
FIG. 1 is a diagram of a plug-in hybrid-electric vehicle illustrating typical drivetrain and energy storage components.

FIG. 1 depicts a typical plug-in hybrid-electric vehicle (HEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also provide reduced pollutant emissions since the hybrid-electric vehicle 12 may be operated in electric mode under certain conditions.

A traction battery or battery pack 24 stores energy that can be used by the electric machines 14. A vehicle battery pack 24 typically provides a high voltage DC output. The battery pack 24 is electrically connected to one or more power electronics modules 26. The power electronics module 26 is also electrically connected to the electric machines 14 and provides the ability to bi-directionally transfer energy between the battery pack 24 and the electric machines 14. For example, a typical battery pack 24 may provide a DC voltage while the electric machines 14 may require a three-phase AC current to function. The power electronics module 26 may convert the DC voltage to a three-phase AC current as required by the electric machines 14. In a regenerative mode, the power electronics module 26 may convert the three-phase AC current from the electric machines 14 acting as generators to the DC voltage required by the battery pack 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the battery pack 24 may provide energy for other vehicle electrical systems. A typical system may include a DC/DC converter module 28 that converts the high voltage DC output of the battery pack 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary 12V battery 30.

The vehicle 12 may be an electric vehicle or a plug-in hybrid vehicle in which the battery pack 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module may condition the power supplied from the EVSE 38 to provide the proper voltage and current levels to the battery pack 24. The power conversion module 32 may interface with the EVSE 38 to coordinate the delivery of power to the vehicle.

The EVSE connector 40 may have pins that mate with corresponding recesses of the charge port 34.

The EVSE 38 may be designed to provide AC or DC power to the vehicle 12. Differences in the connector 40 and charging protocol may exist between an AC and a DC capable EVSE 38. Provision of DC power may require different safety measures than an AC connection. An EVSE 38 may also be designed to provide both types of power. The EVSE 38 may be capable of providing different levels of AC or DC voltage.

The various components discussed may have one or more associated controllers to control and monitor the operation of the components. The controllers may communicate via a serial bus (e.g., Controller Area Network (CAN)) or via discrete conductors.

Figure 2:
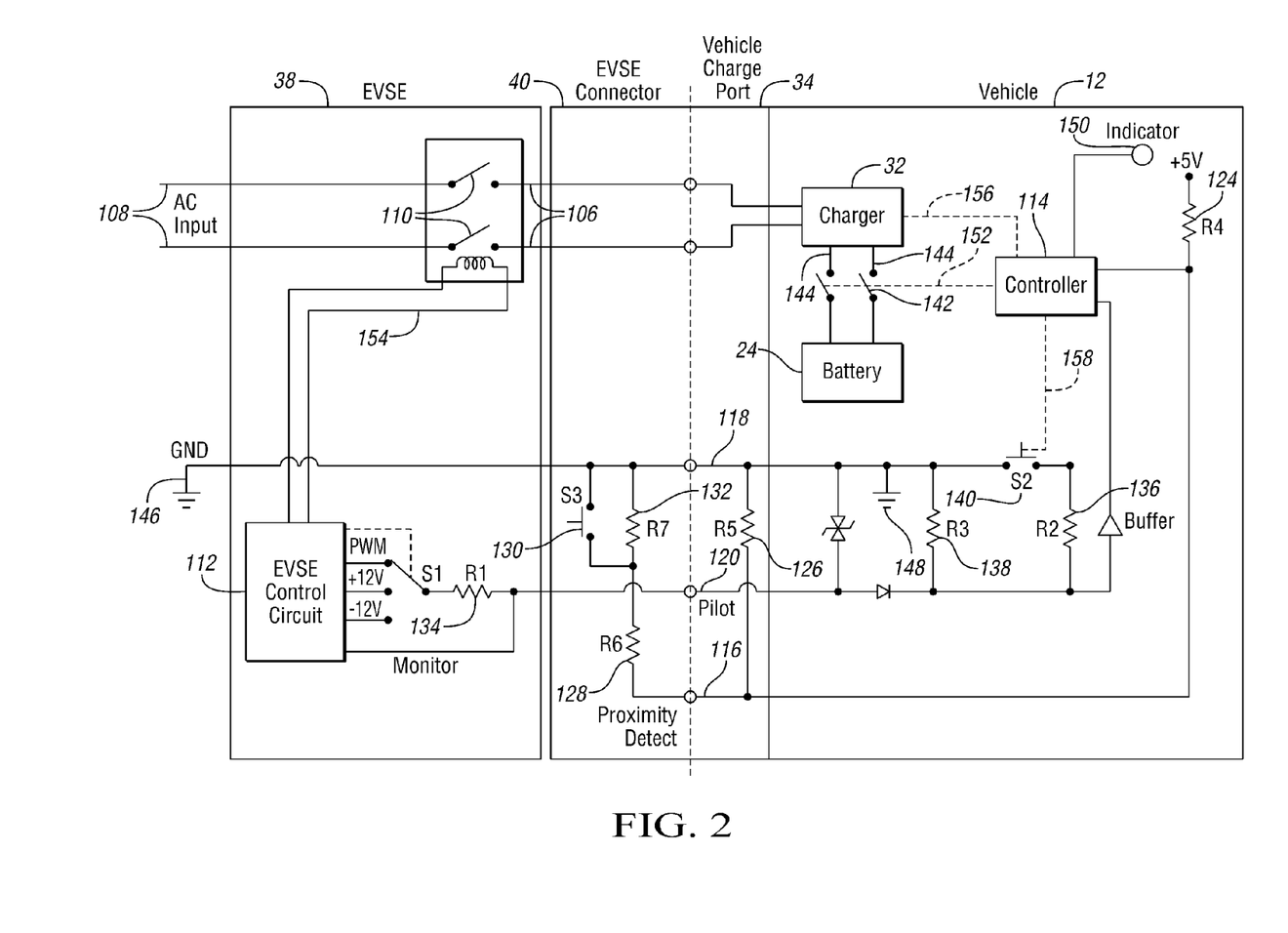
FIG. 2 is a diagram illustrating a typical connection interface between a vehicle and EVSE.

FIG. 2 shows a high-level diagram of a charging system according to the J1772 standard. The vehicle 12 may have an onboard power conversion or charger module 32 that converts a voltage provided by EVSE 38 to a voltage compatible with the battery 24. An EVSE 38 may provide an AC voltage while the battery 24 requires a DC voltage. The onboard charger 32 may convert the AC voltage to a DC voltage required by the battery 24. The operation may be controlled by one or more controllers 114 in the vehicle 12 and by one or more controllers 112 in the EVSE 38. Between the battery 24 and charger 32, there may be one or more contactors 142 present. The charge contactors 142 may selectively couple output lines 144 of the charger 32 and the terminals of the traction battery 24. The charge contactors 142 may isolate the battery 24 from the charger 32 when not charging the traction battery. When a connection to the charger output lines 144 is required, the contactors 142 may be closed to connect the battery 24 to the charger 32. The contactors 142 may be opened and closed by a control signal 152 driven by one or more controllers 114. The contactors 142 may utilize a relay-type contactor or a solid-state device to achieve the function. The contactors 142 may be opened when a charge connector 40 is not attached to the charge port 34.

The EVSE connector 40 connects to the vehicle charge port 34. The physical and operational properties of the connections are defined by the J1772 standard. The EVSE 38 may provide one or more high-power lines 106 to the vehicle 12. The high-power lines 106 may provide a line for high-voltage and a return path to complete the circuit. The EVSE 38 may be capable of connecting and disconnecting AC input power 108 to the high-power lines 106 as required. The EVSE 38 may have contactors 110 for selectively connecting the high-power lines 106 to the AC input power 108. The EVSE contactors 110 may be opened and closed by a control signal 154 driven by the EVSE controller 112. The contactors 110 may utilize a relay-type contactor or a solid-state device to achieve the function. The control signal 154 may drive a relay coil to control a relay.

In addition to the high-power lines 106, the EVSE 38 may interface with the vehicle 12 via a number of signal lines (116, 120) to aid in controlling the charging process. The signal lines are low power signals that provide an interface between the control module 112 of the EVSE 38 and the controller 114 in the vehicle 12. The EVSE control circuit 112 may include a microprocessor system having the capability to process the input values and generate output signals as appropriate. The controllers (114, 112) may include appropriate analog-to-digital conversion circuitry to measure the voltage level of the signals.

The signals may be monitored to determine whether an EVSE connector 40 is connected to the charge port 34. Detecting a connection is important as it may provide an indication that charging is possible and also to prevent a driver from driving off while an EVSE connector 40 is attached to the vehicle 12. A proximity signal 116 may be defined that is indicative of a state of engagement between the charge port 34 and the EVSE connector 40. The voltage of the proximity input 116 measured by the controller 114 may vary based on the configuration of various resistances in the circuit.

In addition to the signal connections, a ground connection 118 may be provided by the EVSE connector 40. The ground connection 118 may provide a path to the ground point 146 of the EVSE 38. The corresponding vehicle charge port 34 connection may be connected to a ground connection 148 of the vehicle 12. When the EVSE connector 40 is plugged into the charge port 34, the EVSE ground 146 and the vehicle ground 148 may be at a common level. The common ground 146 allows both controllers to determine the same level of the voltages on the signal lines (120, 116).

The voltage of the proximity detect input 116 at the controller 114 input varies as a function of the voltage divider network created by the resistance values in the EVSE connector 40 and the vehicle charge port 34. In an unconnected condition, the proximity signal 116 may have a voltage that is the result of voltage divider circuit comprised of resistances R4 124 and R5 126 relative to the vehicle ground 148. The approximate voltage that would be measured at the controller 114 may be 5V*(R5/(R5+R4). A voltage at this level may be indicative of disengagement between the charge port 34 and the EVSE 38.

When the EVSE connector 40 is installed in the charge port 34 and the pins have made contact, resistances R6 128 and R7 132 may be in parallel with resistance R5 126. This alters the voltage divider network and changes the voltage measured at the proximity detect input 116. The EVSE connector 40 may have a button or latch that operates a switch S3 130. The button or latch may change the state of switch S3 130 when inserting or removing the EVSE connector 40. If the switch S3 130 is open, the series combination of R6 128 and R7 132 will be in parallel with R5 126. If switch S3 130 is closed, R6 128 will be in parallel with R5 126. In each case, the voltage measured by the controller 114 will change levels. By measuring the voltage of the proximity detect pin 116, the vehicle controller 114 can determine if the EVSE connector 40 is attached and the status of the switch S3 130. To summarize, a controller 114 may read a different voltage value when the charge connector 40 is not connected, when the charge connector 40 is connected with switch S3 130 open, and when the charge connector 40 is connected with the switch S3 130 closed.

A control pilot signal 120 may be present. The SAE standard defines the behavior of the control pilot signal 120. The pilot signal 120 is used to control the charging process. The vehicle 12 and the EVSE 38 are expected to monitor the pilot signal 120 and respond according to the status of the signal. The EVSE controller 112 may connect the pilot signal 120 to output values of +12V, −12V, or a PWM output depending on the charging status. When the EVSE connector 40 is disengaged from the charge port 34, the EVSE controller 112 may connect the pilot signal 120 pin to +12V. When the connector 40 is disengaged from the charge port 34, the vehicle controller 114 may measure a value near zero volts as the pilot signal 120 is connected to the vehicle ground 148 through resistor R3 138. A pilot signal 120 measured by the vehicle controller 114 that is near zero volts may be indicative of a state of disengagement between the EVSE connector 40 and the charge port 34 and may represent a default vehicle pilot signal 120.

Once the EVSE connector 40 is engaged in the vehicle charge port 34, the +12V originating from the EVSE controller 112 may be provided to the vehicle pilot signal circuitry. When the connector 40 is engaged and connected to the charge port 34, the pilot signal 120 voltage at the connector may be defined by the voltage divider formed by resistances R1 134 and R3 138 relative to ground 146. The resulting voltage may indicate to the vehicle controller 114 and EVSE controller 112 that the connecter 40 is connected to the charge port 34 and represents a valid pilot signal 120. Under normal conditions, the proximity detect signal 116 may indicate the same engagement status.

In response to a connection being established, the vehicle controller 114 may close a switch S2 140 which places resistance R2 136 in parallel with resistance R3 138. The switch S2 140 may normally be open. The switch S2 140 may be controlled by the vehicle controller 114 via a control signal 158. The switch S2 140 may be a relay or solid-state switching device. The vehicle controller 114 should close switch S2 140 if it determines that the vehicle 12 is ready to accept energy from the EVSE 38. A condition for closing switch S2 140 may be that the vehicle is in a proper non-propulsion state. The condition may include being in a parked condition or at zero vehicle speed. Closing the switch S2 140 alters the voltage divider that was formed by R1 134 and R3 138 by placing resistance R2 136 in parallel with resistance R3 138 and the voltage level of the pilot signal 120 may be changed. The controllers (112, 114) may monitor the control pilot 120 voltage level to determine the current status of the pilot signal 120 based on the voltage measurement.

Once it is determined that the vehicle 12 is ready to accept energy from the EVSE 38, the EVSE controller 112 may provide a PWM signal with a defined frequency to the pilot line 120. The duty cycle of the PWM signal may be proportional to the amount of current that the EVSE 38 is capable of providing. The pilot signal 120 may be considered valid when the frequency and duty cycle of the PWM signal are within predefined limits. Once the vehicle 12 is ready to accept energy from the EVSE 38, the contactors 110 for providing power to the vehicle 12 may be closed. The J1772 standard defines the handshaking and timing of the changes in signal states.

The vehicle 12 may monitor the high-power lines 106 and low-power signal lines 116, 120 as part of a diagnostic function. When an error condition in one of the lines is detected, charging may be stopped. There are various sources of errors for the low-power signals. The EVSE connector 40 may not be properly engaged or connected to the charge port 34 causing poor contact between pins. The pins of the EVSE connector 40 may be bent or damaged and unable to make a proper connection with associated recesses in the charge port 34. The low power signals may be shorted within the connector 40, EVSE 38, charge port 34, or elsewhere in the vehicle 12. In addition, the switches (130, 140) may be stuck in an open or closed position. Error conditions may be due to wear, age or other defects. During normal operation, all of the signals may provide a consistent engagement status for the connection. It may still be possible to infer the engagement status when one or more signals are incorrect.

An important decision for the vehicle controller 114 is to detect when the EVSE connector 40 is engaged in the charge port 34 to determine when power may be taken from the EVSE 38. The decision may consider factors such as safety and charge time maximization. For example, to maximize charge availability, it may be desirable to allow charging in the presence of minor signal issues if it is possible to ascertain the connection status with available signals. Additionally, it may be desired to prevent driving the vehicle 12 when any of the signals appear to indicate that a charge connector 40 is attached to the vehicle 12.

The vehicle controller 114 may determine when the EVSE 38 is connected to the vehicle 12. The controller 114 may determine the connector engagement state from the proximity detect signal 116 which includes the state of the S3 switch 130. The controller 114 may determine that the EVSE connector 40 is engaged when the proximity signal 116 is detected, regardless of the state of the S3 switch 130. In addition, the controller 114 may determine that the charge plug 40 is connected when a voltage on the high-power lines 106 is detected regardless of the status of the proximity signal 116. The controller 114 may detect that the EVSE connector 40 is engaged when a valid pilot signal 120 is detected. Ideally, all of the signals would indicate the same status of the connection. However, in practice, it is possible that one or more signals may indicate a different status or may be non-operational. In order to maximize charge availability and to prevent drive-off, it may be desirable to allow charging in the presence of uncertainty in some of the signals.

The proximity detect input conductor 116 may indicate a state of engagement between the charge port 34 and the EVSE connector 40. During normal operation of the proximity detect input 116, a connection will be detected when the EVSE connector 40 is inserted in the charge port 34. Should the proximity detect input 116 not be functioning correctly, the proximity detect input 116 may indicate an invalid state for the present state of engagement between the EVSE connector 40 and the charge port 34. For example, the proximity detect input 116 may not change voltage when an EVSE connector 40 is engaged in the charge port 34 due to a bent pin. The state of engagement between the charge port 34 and the EVSE connector 34 may be ascertained by the presence of a valid control pilot signal 120 or by the presence of AC voltage 106 at the charger 32. In the event that an invalid proximity signal for the state of engagement is detected, the controller 114 may prevent driving of the vehicle and may also permit charging of the traction battery 14.

The controller 114 may prevent driving of the vehicle in several ways. A signal may be communicated to a transmission controller to inhibit shifting to prevent the driver from shifting the vehicle out of park. A propulsion disable signal may be communicated to an engine controller and an electric machine controller to inhibit operation of the engine and electric machines so that no propulsive torque may be generated. In addition, the controller may output an indicator on a display 150 to provide the driver with feedback that the connector 40 is engaged with the charge port 34.

The proximity detect input signal 116 may indicate the states of engagement based on the proximity input signal 116 voltage and the state of the S3 switch 130. A state indicative of disengagement may be detected when the voltage of the proximity detect input signal 116 is at a level defined by the voltage divider formed by resistances R4 124 and R5 126. A state indicative of engagement with switch S3 130 closed may be detected when the voltage is at a level defined by the voltage divider formed by resistance R4 124 and the parallel combination of R5 126 and R6 128. A state indicative of engagement with switch S3 130 open may be detected when the voltage is at a level defined by the voltage divider formed by resistance R4 124 and the parallel combination of resistance R5 126 in parallel with the sum of resistances R6 128 and R7 132. An indeterminable state may be detected when the voltage measured is not near any of the other voltage states (e.g., shorted to ground or power). The indeterminable state may be considered to be indicative of disengagement as otherwise a permanent connection may be deemed to be present that may prevent driving the vehicle when no connector is actually engaged. In the indeterminable state, the state of engagement may be ascertained via a valid control pilot signal 120. The indeterminable state may store a diagnostic code to indicate the error status the proximity signal. In addition, the engagement status may be further ascertained from the state of the pilot signal 120. For each state, the state of engagement as determined by the proximity detect input 116 is based on a different voltage level measurement.

The switch S3 130 is typically integrated with a latch that holds the EVSE connector 40 in place during charging. A button on the charge connector 40 handle may release the latch and open the switch S3 130. The switch S3 130 is in a normally closed position. The depression of switch S3 130 typically means that the latch is being unlatched so that the EVSE connector 40 can be removed from or inserted into the charge port 34. When the button is pressed, the switch S3 130 moves to an open position. Detecting that switch S3 130 has been depressed allows the EVSE 38 and vehicle 12 to prepare for starting and ending the charging process. The physical latching device associated with switch S3 130 may be prone to wear, breakage or other damage. Under some conditions, the latch may not seat correctly when engaging the EVSE connector 40 with the charge port 34 and the switch S3 130 may appear stuck in the open position. In practice, there is a chance that the switch S3 130 may be stuck in an open or closed position. Since the switch S3 130 may become unreliable over time, it may be undesirable for the charging system to rely on the switch S3 130 to control the charging process. When connected and charging, detection that switch S3 130 is open may initiate a controlled shutdown of the charging in anticipation of the EVSE connecter 40 being disengaged from the charge port 34.

Upon detection that switch S3 130 is open, the controller 114 may immediately disable the high-voltage outputs 144 from the charger 32. The controller 114 may allow switch S2 140 to remain closed for a predetermined period of time. After a predetermined period of time, if the switch S3 130 is still detected as being open, the switch S2 140 may be opened to inhibit further charging operations. If the switch S3 130 returns to the closed position before the predetermined amount of time, power conversion may be reinitiated. Additionally, the status of the proximity input 116 and the pilot signal 120 may be monitored as well.

The detection of a switch S3 130 that is stuck open may require monitoring the proximity detect 116 signal upon plug in. This may be detected when the controller 114 wakes up with the control pilot signal 120 and a valid proximity input 116 is detected. The proximity input 116 may indicate that the switch S3 130 is in an open position. When the EVSE connector 40 is engaged and connected to the charge port 34, the controller 114 may expect that the switch S3 130 be in a closed position. The controller 114 may wait a predetermined amount of time (e.g., 10 seconds) for the proximity signal 116 voltage to indicate that the switch S3 130 is closed. During this time, charging may be inhibited and the switch S2 140 may remain open. After the predetermined wait time, the switch S2 140 may be closed to allow charging to commence. If the proximity signal 116 voltage indicates that switch S3 130 has closed during the wait period, the normal charging sequence may be initiated.

The controller 114 may close the switch S2 140 when the vehicle is in a proper non-propulsion state. The charge system may delay closing the switch S2 140 until after the switch S3 130 is closed. This may prevent high voltage on the load side of the EVSE contactors 110 that may interfere with EVSE weld check testing. This condition is important when consecutive switch S3 130 actions are performed by the operator.

Diagnostic—Detection and Response

Referring to FIG. 2, the off-board equipment (38, 40) may have diagnostic conditions that prevent the vehicle 12 from charging. The vehicle controller 114 may use the state of the inputs to deduce operating conditions and perform diagnostic strategies to allow charging and prevent drive-off. Special precautionary actions may be activated to assure safe charging operation and interrupt charging as necessary. The on-board controller 114 may monitor the EVSE input conditions and, in the presence of any input diagnostic codes, perform specified actions to mitigate a no charge condition. For example, the controller 114 may permit charging with proximity detection 116 circuit diagnostic codes or with a stuck S3 switch 130. The controller 114 may report a connector present with only a valid control pilot signal 120 detected for drive away protection. The controller 114 may provide enhanced connector disconnect monitoring for rapid power conversion disable to stop charging safely.

The controller 114 may detect a sudden loss of high-voltage power 106 and loss of the pilot signal 120 while the charger is in a ready condition. Upon detection, the controller 114 may report not ready and proceed to shut down. The event may be recoverable when a valid pilot signal 120 is present to perform a restart. The loss of high-voltage power 106 by itself may not necessarily set a diagnostic code. The controller 114 may initially detect a loss of high-voltage power 106 and the pilot signal 120 while the proximity signal 116 indicates a state of engagement. The power conversion may be immediately interrupted. The controller 114 may continue to detect a loss of high-voltage power 106 and the pilot signal 120 for a predetermined period of time to debounce the condition (e.g., 3 seconds). After the predetermined debounce time, the controller 114 may change to a not ready condition and perform a shut down. The controller 114 may disconnect from the EVSE process by opening the switch S2 140. Should the high-voltage power 106 and pilot signals 120 return to normal levels before the predetermined debounce time, the power conversion may be restarted.

There may be conditions in which the EVSE connector 40 is engaged with the vehicle charge port 34 but the inputs indicate differing engagement statuses. The pilot signal 120 may be valid but the proximity signal 116 may indicate a state of disengagement. In this situation, normal charging may be permitted and a proximity signal diagnostic code may be stored for subsequent power-on cycles. Upon the next vehicle system power-up after the detection of the proximity diagnostic code, the controller 114 may report the previous proximity signal diagnostic code. This may advise the driver of the need to check the EVSE 38 for possible problems. An indicator 150 may be present in the vehicle and the controller 114 may provide an output to change the state of the indicator. The indicator 150 may be a lamp or a status message on a display. After a number of consecutive charge cycles with the same issue, a permanent diagnostic code may be stored and the indicator 150 may be set until the condition is repaired. After the condition is repaired and the signals are measured as expected, the proximity signal diagnostic code may be cleared from memory.

The controller 114 may detect a stuck switch S3 130 when the proximity signal 116 is properly connected with switch S3 130 open. This condition may be detected upon observing a valid pilot signal 120 or AC input voltage 106 without switch S3 being detected as closed. The initial proximity signal voltage measurement should indicate a closed S3 switch 130 since the S3 switch 130 should close when a connector 40 is engaged in the charge port 34. This condition may be required to be present for a predetermined period of time before a diagnostic code is indicated in order to debounce the condition and distinguish the condition from an operator holding the switch 130 open. A stuck switch S3 130 may not affect the charging process as it is a detectable when the EVSE connector 40 is engaged and connected to the charge port 34 and the proximity signal 116 is at a voltage level that indicates a state of engagement. Normal charging may be allowed when the condition is detected. In addition, the condition may not be announced to the operator unless it has occurred over a predetermined number of charge cycles.

The controller 114 may detect that high-voltage power 106 is present when it is not commanded. This may be detected by monitoring the high-voltage power lines 106 and detecting voltage while the switch S2 140 is commanded open. Switch S2 140 being open normally means that high-voltage power 106 should not be present at the connector 40. Additionally, high-voltage power 106 should not be present in the absence of a valid control pilot signal 120 and a proximity detect input 116 that indicates a state of engagement. The controller 114 may indicate to the system that the plug 40 is engaged and may set a diagnostic code. The charging system may shut down to conserve power.

The controller 114 may detect that high-voltage power 106 is not present when it should be. High-voltage power 106 should be available after the switch S2 140 is closed. The controller 114 may monitor the high-voltage power lines 106 for a period of time after switch S2 140 is closed. If high-voltage power 106 is not detected within a predetermined amount of time, a diagnostic code may be set. The charging system may shutdown when this condition is detected.

The controller 114 may detect an invalid control pilot signal 120. The invalid pilot signal 120 may be detected when switch S2 140 is closed and the proximity input 116 indicates a state of engagement. The pilot signal 120 may be monitored for a loss of signal by detecting a duty cycle of zero which indicates that the pilot circuit may be open. The pilot signal 120 may be monitored for a short to power within the vehicle. The pilot signal 120 may be monitored to detect if the signal is within the proper duty cycle and frequency ranges as defined by the operating specifications. The invalid signal may be required to be present over a first predetermined interval to properly debounce the condition. When the invalid condition has been present for the predetermined interval, power conversion may be interrupted. The charging system may be shut down if the invalid signal is present for a second longer interval. Upon shut down, the switch S2 140 may be opened and a diagnostic code may be stored. A diagnostic indication 150 may be presented to the operator.

An incorrect pilot signal 120 may be detected at startup. In a startup condition the charging system may be off and a high level of the control pilot 120 wakes the charger. During startup, the switch S2 140 is open and the proximity signal 116 may indicate a state of engagement. When an incorrect pilot signal 120 is detected under these conditions, charging may not be initiated and the switch S2 140 may remain open. Should the incorrect condition exist for a predetermined amount of time, a diagnostic code may be stored and a diagnostic indication 150 may be presented to the operator.

The controller 114 may identify an incorrect proximity detection 116 signal. The controller 114 may detect an open circuit condition or a short circuit condition such that the controller cannot determine if the EVSE connector 40 is engaged with the charge port 34. The condition may be detected when an electrical circuit discontinuity occurs within the charge port 34. Any condition that changes the voltage divider network may be detected. Any voltage measurement that does not correspond to one of the known resistor combinations may be suspect. Such a condition may be detected without an EVSE connector 40 being engaged. Without an EVSE connector 40 engaged, an indeterminable state may be detected. Additionally, an open or short condition within the EVSE connector 40 may affect the voltage divider network leading to an indeterminable state of the proximity input 116. Assuming the pilot signal 120 and high-voltage power 106 are detected as working properly, the controller 114 may still allow charging without reporting a diagnostic code. A diagnostic code may be stored and charging inhibited when the pilot signal 120 and high-voltage power 106 are detected as not connected or invalid.

The controller 114 may allow charging regardless of the status of the proximity input 116. When a proximity input 116 diagnostic code is present, the switch S3 130 button press detection may not be available as this is detected as part of the proximity input 116 detection. An alternative charge interruption strategy may be necessary when the proximity input 116 is not functioning as expected. Power conversion may be interrupted when the state of the pilot signal 120 indicates a change from a state of engagement to a state of disengagement. When the proximity input 116 indicates a state of disengagement while a valid pilot signal 120 is present, a debounce time for the pilot signal 120 may be decreased to allow for a faster detection of the EVSE connector 40 removal. For example, under normal conditions, the control pilot 120 debounce time may be 5 seconds, that is, the state may be allowed to change if the state is present for 5 seconds. When the proximity signal 116 is in disagreement with the control pilot 120 regarding the state of engagement, the debounce time may be set to 1 second. The incorrect proximity input 116 may be detected before vehicle charging begins. The vehicle 12 may begin charging based on a valid pilot signal 120. When the pilot signal 120 indicates a state of disengagement, the charging process may be interrupted. The EVSE connector 40 may be re-inserted and charging may be started again provided an appropriate pilot signal 120 is detected. The incorrect proximity input 116 may store a diagnostic code and the operator may receive an indication 150 of the incorrect proximity input 116.

When the high-voltage power 106 is an alternating current (AC) type, the controller 114 may monitor the frequency of the voltage. When the pilot 120 and proximity 116 signals are operating correctly, the high-voltage lines 106 may be monitored to ensure that the correct voltage is present. Pilot 120 and proximity 116 signal errors may have priority over an AC input frequency errors. The AC line 106 may be monitored for a predetermined time after the pilot signal 120 is present and the switch S2 140 is closed. The controller 114 may monitor the time between zero crossings of the AC signal to determine the frequency of the AC input. An error counter may be incremented if the frequency is below 40 Hz or above 70 Hz. After a predetermined number of frequency errors, a diagnostic code may be stored. The frequency diagnostic code may not necessarily affect the charging process. If the pilot signal 120 is lost along with an AC frequency error, this may be an indication that AC power has been lost. This may trigger the setting of an AC power loss which has higher priority than an AC frequency error.

Charger-Internal DC-DC Converter

Figure 3:
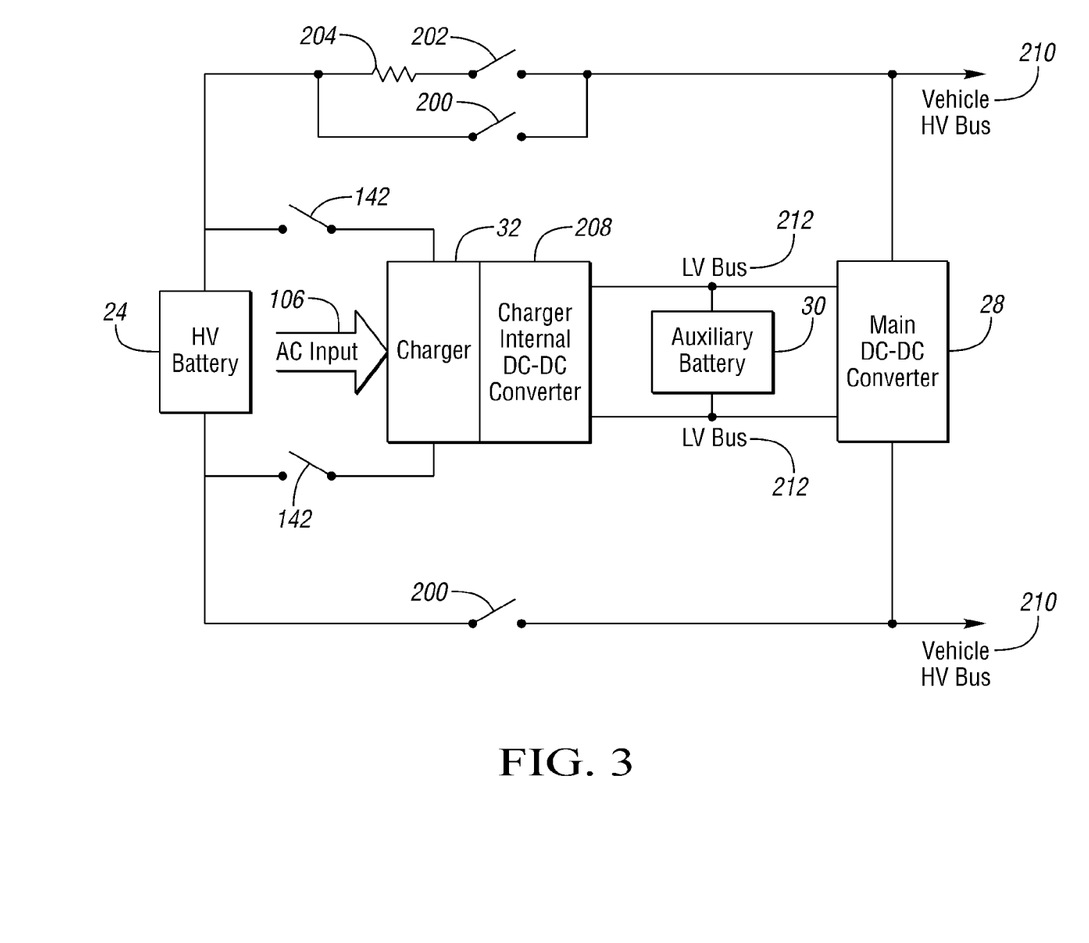
FIG. 3 is a diagram illustrating an example of a configuration of a vehicle high-voltage and low-voltage charging system.

FIG. 3 shows an example of a diagram of the vehicle charging system. A charger module 32 receives an AC input voltage 106 from a source external to the vehicle. A high-voltage traction battery 24 is coupled to the charger module 32 through one or more charge contactors 142. The traction battery 24 is also coupled to a vehicle high-voltage bus 210 through one or more main contactors 200. The vehicle high-voltage bus 210 may include a power and return line in which the power line may be coupled to a positive terminal of the traction battery 24 and the return line may be coupled to a negative terminal of the traction battery 24. The traction battery 24 may also be coupled to the vehicle high-voltage bus 210 through a pre-charge contactor 202 and pre-charge resistor 204. The pre-charge contactor 202 may be closed prior to closing the main contactor 200 in order to limit current flow in the circuit. A main DC-DC converter 28 may be connected to the vehicle high-voltage bus 210. The main DC-DC converter 28 may convert high-voltage DC to a low-voltage DC compatible with a 12V battery 30. The auxiliary 12V battery 30 and the low-voltage output of the main DC-DC converter 28 may connect to a low-voltage bus 212 that supplies 12 volt power to other modules in the vehicle. The low-voltage bus 212 may include a power and return line in which the power line may be coupled to a positive terminal of the auxiliary battery 30 and the return line may be coupled to a negative terminal of the auxiliary battery 30. Note that the system described is equally applicable when the low-voltage system 212 is other than 12V (e.g., 42V).

A controller (114, FIG. 2) may control the contactors (142, 200, and 202) to provide high-voltage power to various modules requiring high-voltage power. Under normal driving conditions, the main contactor 200 may be closed to provide power to the high-voltage bus 210. The main contactor 200 may be a relay controlled contactor that closes to provide power to the high-voltage components (e.g., inverters, converters, heaters, etc.). Power inverters, heating modules and cooling modules may be connected to the high-voltage bus 210. The charger 32 may be connected to the high-voltage traction battery 24 via one or more charge contactors 142. During charging operations, the charging contactor 142 may be closed to allow power to be supplied from the charger 32 to the battery 24. AC voltage 106 is supplied to the charger 32 and converted to high-voltage DC by the charger 32. When the charge contactor 142 is closed, the voltage output of the charger 32 may be supplied to the high-voltage traction battery 24. The main contactor 200 and the charge contactor 142 may be activated at the same time if high-voltage components must operate while the EVSE connector (40, FIG. 1) is attached.

Connecting a vehicle to an off-board EVSE requires low-voltage 12V electrical power to operate the vehicle systems. Modules drawing power from the low-voltage bus 212 of the vehicle may, over time, deplete the on-board auxiliary battery 30. Energizing the main high-voltage DC-DC converter 28 may provide support at the expense of enabling additional high-voltage and 12V loads and creating unnecessary energy losses. In addition, the reduced 12V load conditions present during charging may not be optimal for a larger main high-voltage DC-DC converter 28 which further compounds the energy losses. These losses may result in longer charge timers and lower miles per gallon electric (MPGe) ratings.

A charger-internal DC-DC converter 208 may be incorporated with the charger 32 module to support the vehicle low-voltage bus 212 directly from the AC input 106 when a charge connector is attached to the vehicle. This reduces the need for additional vehicle system activity and results in a highly optimized configuration. The smaller charger-internal DC-DC converter 208 may be appropriately sized and selected for highest efficiency at light charging system 12V load conditions. The charger internal DC-DC converter 208 may convert high-voltage DC from the charger module 32 to low-voltage DC compatible with the auxiliary 12V battery 30. An output of the charger internal DC-DC converter 208 may be connected to the low-voltage power bus 212 to provide low-voltage power to the system during charging.

During normal operation, the main DC-DC converter 28 is connected to the high-voltage bus 210 through the main contactor 200 and provides power to the auxiliary battery 30. However, during charging, there may be no need to close the main contactor 200. Closing the main contactor 200 provides high voltage to all the modules on the high-voltage bus 210. This may lead to additional power usage as components that are not necessary during charging may be required to be activated to manage the high voltage. In addition, during charging, the power requirements of the low-voltage bus 212 may be lower than during normal operation. The main DC-DC converter 28 may be optimized to provide power at a higher power output levels and may be less efficient at the lower power levels required during charging operations. The main contactor 200 may be closed during charging for features such as cabin pre-heating and pre-cooling.

The charger internal DC-DC converter 208 may be optimized to maximize power conversion efficiency at a lower power output level (e.g., 300 Watts) than the main DC-DC converter 28. During charging, the charger internal DC-DC converter 208 may be activated to provide power to the low-voltage bus 212. The advantage of this arrangement is that the main contactor 200 does not need to be closed during charging. In addition, the charger internal DC-DC converter 208 may be optimized to maximize power conversion efficiency for operating conditions and loads present during charging. For example, the converter 208 may be designed for operation during extended charging periods as opposed to operation during shorter drive cycles. Additionally, the second DC-DC converter 208 on the charging side may reduce the wear of the main contactors 200 as they need not necessarily be closed during charging.

The charger internal DC-DC converter 208 may be configured to have an adjustable voltage output in a range compatible with the 12V auxiliary battery 30. The voltage output may be adjusted to provide an appropriate level of charging to the auxiliary battery 30. The voltage output may be adjusted to prevent gassing issues with the battery 30. The voltage output may be determined by another module and communicated to the charger internal DC-DC converter 208. The charger internal DC-DC converter 208 may be operated independently of charging the high-voltage battery 24. The charger internal DC-DC converter 208 may be configured to operate regardless of the status of the charge contactor 142. This provides an additional mode of operation in which the charger internal DC-DC converter 208 may operate to charge the 12V battery 30 while AC voltage 106 is present to maintain the low-voltage bus 212 independent of charging of the high-voltage battery 24.

The operation of the charger internal DC-DC converter 208 is such that it may be operable before, during and after charging of the high-voltage battery 24. The system may delay the waking of other 12V modules for a predetermined period of time to allow the charger internal DC-DC converter 208 to stabilize the low-voltage bus 212 before loading begins. A signal to wake up other modules may be delayed until after the low-voltage stabilization period. For example, the charger 32 may wake up based on the control pilot signal (120, FIG. 2). The charger 32 may provide an output that indicates when a signal may be sent to other modules for wake-up purposes.

The charger internal DC-DC converter 208 provides some advantages over a single main DC-DC converter 28. Connecting AC power 106 to the charger 32 does not require that the main contactor 200 be closed. This reduces wear on the main contactor 200 due to operation during charging. In addition, no additional power is drawn from modules connected to the high-voltage bus 210 which reduces the power required from the external power source.

Pilot Latch Out Signal and Wakeup

Figure 4:
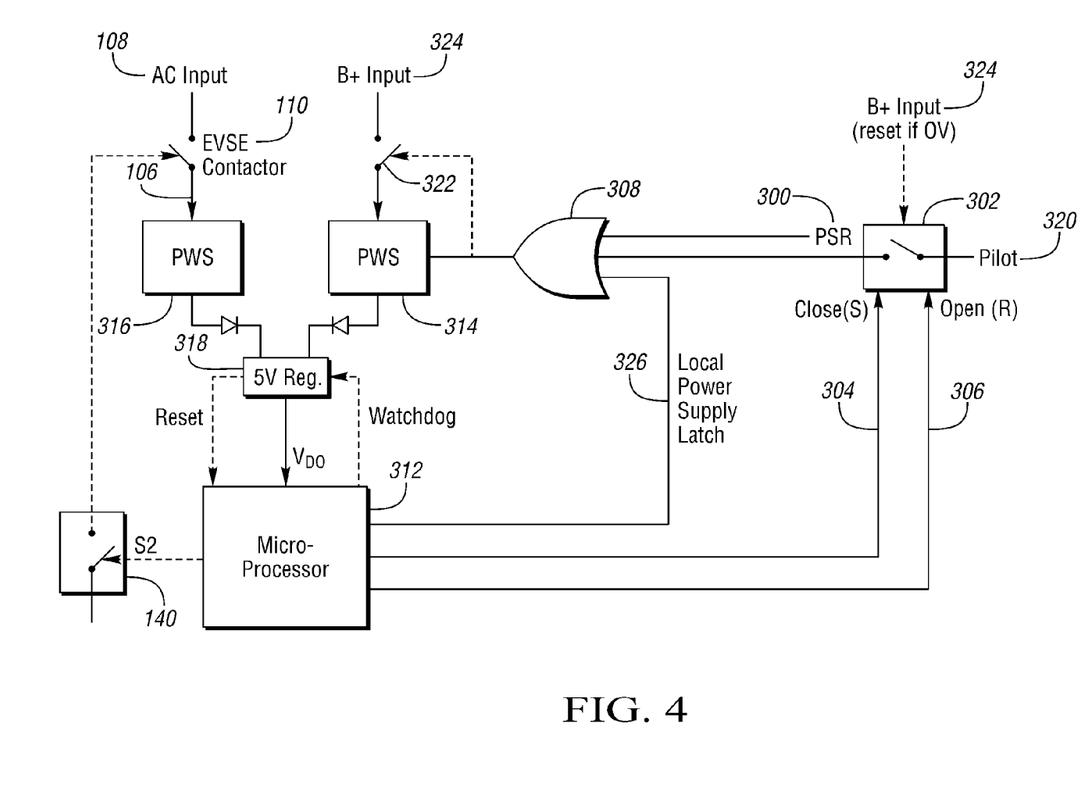
FIG. 4 is a diagram illustrating an example of power-up circuitry using a pilot signal input.

FIG. 4 shows an example of the signals that may be used by the vehicle charging control system for wakeup and shutdown. Another function of the pilot signal 320 is to provide a wake-up to the charger. The on-board charging system may contain an EVSE control pilot latch out feature 302 to allow the charging system to minimize power consumed by the vehicle during a high-voltage charge wait interval or after a high-voltage charge event is complete. The latch-out mechanism 302 prevents the EVSE pilot signal 320 from powering up the charging system when AC power is not required by the vehicle. Off-board AC power is used only when necessary, thereby improving charging system efficiency. The vehicle charging control system may reconnect to the EVSE upon receiving a vehicle-wide power sustain relay (PSR) wakeup signal 300. The on-board charger processor 312 may wakeup and reset the control pilot latch-out circuit 302. The control pilot 320 may also be latched out if the charger detects a fault condition and cannot perform power conversion.

The pilot latch out mechanism 302 may prevent the pilot signal 320 from affecting the operations directed by the vehicle controller 312. The pilot signal 320 may be used to wake up the vehicle controller 312. The controller 312 may open the pilot latch-out 302 when the control pilot signal 320 is present after completion of shutdown when reporting a fault condition. This assures that the charger will not continuously cycle between on and off states after a fault occurrence. This also prevents unnecessary energy consumption and 12V battery drain.

During normal usage, the pilot signal 320 wakes up the controller microprocessor 312 when present and in a valid state. The microprocessor 312 may be part of the vehicle controller (114 FIG. 2). When the EVSE connector is engaged and connected, the pilot signal 320 voltage may be at a high level (e.g., EVSE supplies 12V to pilot circuit). The transition to a high signal may trigger the vehicle charging system to wake up and begin charging. In addition, a power sustain relay signal (PSR) 300 may also wake up the controller 312. The PSR signal 300 may be activated during a key-on procedure to wake up all modules in the vehicle. Either the PSR signal 300 or the pilot signal 320 may wake up the charger controller 312. In addition, the controller 312 may have a power supply latch signal 326 that allows the controller 312 to keep power applied until conditions are proper to shut down. Upon one or all of the PSR 300, power supply latch 326, or control pilot 320 signals being asserted, a contactor 322 may be closed to connect a 12V battery power source 324 to a power supply 314 configured to provide power to the charge controller 312. The actual implementation may be an OR function 308 or equivalent that performs a logical or of the three signals. During charging, the pilot signal 320 may be a PWM signal from the EVSE controller. To prevent the power supply 314 from changing state, the local power supply latch signal 326 may be asserted by the microprocessor 312. The pilot signal 320 may also be a processed version of the input pilot signal (120 FIG. 1) that is asserted when there is valid activity on the input pilot signal (120 FIG. 1).

The power supply 314 may feed a 5V regulator 318 that provides power to the components, including a microprocessor 312, in the charger system. Once the charger controller 312 is powered up and operating, the charge system inputs may be read and processed. When proper conditions are present as discussed previously, the controller 312 may close the S2 switch 140 to activate the EVSE contactors 110 to provide high-voltage power 106 to the charger. The AC input power 106 may feed a power supply 316 having an output that may be fed into the 5V regulator 318. The 5V regulator 318 may be supplied by one or both of the power supplies 314, 316.

Under certain conditions, the micro-controller 312 may desire to shut down to prevent consuming power from the EVSE. To achieve this, a pilot latch out mechanism 302 may be provided. The pilot latch out mechanism 302 interrupts the connection between the pilot signal 320 and the power supply activation logic of the controller 312. An example implementation may be an SR latch that allows the controller to open and close the pilot signal. For example, issuing a close signal 304 allows the pilot signal 120 to be passed through. Issuing an open signal 306 prevents the pilot signal 120 from being passed through. Once an open signal 306 or close signal 304 is issued by the controller 312, the state remains until changed by the controller 312. In the open condition, the pilot signal 320 will not provide a wakeup to the controller 312. During charging, when the pilot signal 320 is the source of wakeup, removing the pilot signal 320 allows the power supply 314 to shut down. The pilot latch-out mechanism 302 may have power 324 provided at all times to maintain the proper state. If power 324 is removed from the pilot latch-out circuit 302, the pilot latch-out circuit 302 may default to the closed state such that normal operation of the pilot signal 320 is permitted. The controller 312 may monitor the pilot signal 320 and may remove the power supply latch output 326 to enable a shutdown.

To reset the pilot latch-out mechanism 302, a valid PSR 300 signal may be required to restore power to the controller 312 so that a close signal 304 may be issued to restore normal function of the pilot signal 320. Removal and reinsertion of the charge connector may not restore the normal response to the control pilot signal 320. In response to waking up, the controller 312 may check the status of the PSR 300 signal and the close 304 and open 306 signals of the pilot latch-out 302 circuit. The controller 312 may assert the close 304 signal to re-enable the normal pilot 320 signal function after a PSR 300 signal is asserted.

Some EVSE manufacturers have implemented a pause mode button that sets the EVSE control pilot signal (120, FIG. 2) to a 100% duty cycle. The charging system is effectively paused as there is no maximum time limit for remaining in pause mode. The charger may wait for the EVSE to change status and the pause mode may not be considered a faulted state. During this time, power may be consumed from the EVSE to maintain the 12V battery.

An extended wait in pause mode may cause the charger to waste energy from the 12V system as modules may be powered up waiting for a pilot signal 320 to indicate that charging may be initiated. A charge wait interval may be defined as the duration of time since the pause mode was initiated. The charger may be designed to take action after the charge wait interval exceeds a predetermined amount of time (e.g., 24 hours) to mitigate further power consumption. After a predetermined charge wait interval, the charger may interrupt the pilot signal 320 by issuing the open signal 306 to shut down the controller 312. This prevents the vehicle from waiting indefinitely for charging to begin and reduces power consumed from the external supply.

The pilot latch-out 302 mechanism is effectively a switch located on the pilot input 120 into the charge controller. The pilot latch-out mechanism 302 provides a means to switchably connect the charger with the control pilot signal 320. The switch 302 may be a relay type or may be a solid-state switching device. The pilot latch out mechanism 302 may incorporate an SR latch function. The circuit works by interrupting the pilot signal 320 from enabling power to be provided to the controller 312. The processor 312 may open the pilot latch-out 302 when conditions are determined that the charging operation should be stopped. Upon opening the pilot latch-out mechanism 302, the controller 312 may open switch S2 140, causing the EVSE to open the high-voltage power relays 110 and adjust the pilot signal 320 accordingly. The vehicle may then enter a shutdown mode to minimize power consumption. In order to restore operation, the power sustain relay (PSR) signal 300 may be activated by another module. As an example, the pilot latch-out 302 may be implemented as an SR latch circuit. Other implementations are possible and the disclosure is only one example.

The pilot signal 320 may be interrupted (e.g., open signal 306 asserted) when certain interrupt conditions occur. The pilot signal 320 may be interrupted when a valid pilot signal 320 is present and a charge cycle of the traction battery has been completed. The pilot signal 320 may be interrupted when a charging system condition is detected that prevents charging from taking place. The pilot signal 320 may be interrupted when the vehicle remains in pause mode for a predetermined amount of time (e.g., 24 hours). The pilot latch-out 302 may be opened when a delayed charging operation is desired. A delayed charging operation allows the user to specify a specific time for charging. An example of a delayed charging may be related to a user defined cabin pre-conditioning event in which a specified time is given for controlling the cabin temperature to a specified temperature. The vehicle may be plugged into the charger but charging will not take place until a user specified time. It may be desired to reduce power consumed from the utility while waiting for the charge time. In such an event, another controller in the vehicle may activate the PSR 300 signal when it is time to charge.

The latch out mechanism 302 may be reset when a power sustain relay signal 300 is active. The PSR signal 300 wakes the controller 312 so that the pilot latch out mechanism 302 may be closed to allow normal operation. In response to a wakeup via the PSR signal 300, the microprocessor 312 may be programmed to activate the close 304 signal to the pilot latch-out circuit 302. This allows the control pilot signal 320 to function normally. The controller 312 may, in response to a wake-up request other than the control pilot 320, discontinue interruption of the pilot signal 320 by closing the connection. The latch-out mechanism 302 may be closed when power 324 is lost to the pilot latch out mechanism 302. The latch-out mechanism 302 may be applied on any signal that is used to wake up the charger when a charge connector is engaged in the charge port and may not be limited to only the control pilot signal as disclosed.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    a traction battery;
    an auxiliary battery;
    one or more electrical loads connected to the auxiliary battery;
    a charger;
    a first DC-DC converter electrically connected with the auxiliary battery and configured to be selectively electrically connected with the traction battery; and
    a second DC-DC converter electrically connected between the auxiliary battery and the charger, wherein the charger is configured to charge the auxiliary battery via the second DC-DC converter for a predetermined time before enabling power to the electrical loads when the charger is receiving power and the first DC-DC converter is disconnected from the traction battery.

2. The vehicle of claim 1 wherein the charger is further configured to be selectively electrically connected with the traction battery.

3. The vehicle of claim 2 wherein the charger is further configured to charge the auxiliary battery via the second DC-DC converter when the charger is disconnected from the traction battery.

4. The vehicle of claim 2 wherein the charger is further configured to provide power to the first DC-DC converter when the charger is connected to the traction battery and the first DC-DC converter is connected to the traction battery.

5. The vehicle of claim 1 wherein the charger is further configured to adjust a voltage output level of the second DC-DC converter.

6. The vehicle of claim 1 wherein the second DC-DC converter is configured to generally maximize power conversion efficiency in a range of power outputs associated with charging the auxiliary battery.

7. A method of charging an auxiliary battery comprising:
    in response to electric vehicle supply equipment (EVSE) being connected to a vehicle charge port to provide power to an on-board charger and a first DC-DC converter being disconnected from a traction battery, charging the auxiliary battery via a second DC-DC converter electrically connected between the auxiliary battery and the on-board charger for a predetermined time before activating electrical loads connected to the auxiliary battery.

8. The method of claim 7 wherein operating the second DC-DC converter includes adjusting a voltage output level of the second DC-DC converter.

9. The method of claim 7 further comprising operating the first DC-DC converter to charge the auxiliary battery when the first DC-DC converter is switchably connected to the traction battery.

10. The method of claim 7 further comprising operating the second DC-DC converter to charge the auxiliary battery when the on-board charger is not switchably connected to the traction battery.

* * * * *